United States Patent [19]

Erlichman

[11] 3,993,508
[45] Nov. 23, 1976

[54] METHOD FOR MANUFACTURING FLAT BATTERIES

[75] Inventor: Irving Erlichman, Wayland, Mass.

[73] Assignee: Polaroid Corporation, Cambridge, Mass.

[22] Filed: June 20, 1975

[21] Appl. No.: 588,695

[52] U.S. Cl. .............................. 29/623.2; 204/2.1; 29/623.3
[51] Int. Cl.² .................................. H01M 6/00
[58] Field of Search ..................... 136/175, 111

[56] References Cited
UNITED STATES PATENTS

| | | | |
|---|---|---|---|
| 3,708,349 | 1/1973 | Macaulay et al. | 136/175 |
| 3,734,780 | 5/1973 | Bilhorn et al. | 136/111 |
| 3,775,188 | 11/1973 | Oltman et al. | 136/175 |
| 3,907,599 | 9/1975 | Fanciullo et al. | 136/111 |

*Primary Examiner*—Donald L. Walton
*Attorney, Agent, or Firm*—Gerald L. Smith; John W. Ericson

[57] ABSTRACT

A method for manufacturing flat or planar batteries wherein a carbon-impregnated polymeric carrier web which is selectively zonally prelaminated with continuous strips of metal ultimately serving current collector purposes is machined to form discrete current collector subassemblies as an initial step of production. Through the use of select laser cutting, geometries of individual battery elements are maintained. Chemical milling techniques may be utilized for the noted metal removal.

28 Claims, 19 Drawing Figures

METHOD FOR MANUFACTURING FLAT BATTERIES

BACKGROUND OF THE INVENTION

Batteries formed having a flat, multicell configuration have been recognized as having a particular utility as a power source for a variety of products. For instance, when efficiently designed and fabricated, the power sources may exhibit a relatively low internal impedance as well as a relatively high current output capacity. These desirable powering characteristics, when coupled with a generally flat geometric configuration, ideally lend such batteries to a use in complement with compact but sophisticated electronically controlled instruments and devices.

As an example of such a union of components, flat primary batteries have been combined with the photographic film packs employed exclusively in a photographic camera sold by Polaroid Corporation of Cambridge, Massachusetts, U.S.A., under the trademark "SX-70". Described, for instance, in U.S. Pat. Nos. 3,705,542; 3,543662; 3,543,663; and 3,595,661, the film packs are formed comprising a disposable cassette structure containing a dark slide for covering an exposure station in a forward wall thereof, a stack of individual self-developing film units positioned behind the dark slide, a spring platen for urging the film units toward the forward wall to position the uppermost one of the film units in the stack at the exposure station and a flat battery positioned opposite to the platen having adjacent terminal surfaces of opposed polarity which are accessible from the rearward wall of the cassette. Thus configured, the film pack is ideally suited as a component within a photographic system incorporating a highly automated camera of complementing compact configuration. Such a camera may include integrated solid state control circuits as detailed in U.S. Pat. No. 3,774,516 which serve a myriad of functions including the control of tractive electro-magnetic drives as described, inter alia, in U.S. Pat. Nos. 3,791,278; 3,750,543; 3,805,204; and 3,820,128. Additionally, the power supply provided the camera permits a utilization of dynamoelectric motor drives and the like as disclosed, for instance, in U.S. Pat. Nos. 3,811,081 and 3,731,608.

For practical utilization, the flat battery structures should be capable of exhibiting efficient performance characteristics without the external application of compressive forces. Alternatives to otherwise necessary compression deriving techniques generally have looked to the incorporation of adhesives, particularly between particulate active electrode materials and current collector surfaces. For instance, in U.S. Pat. No. 3,770,504 particulate electrode material deposited upon a carbon impregnated polymeric current collector surface is adhered thereto utilizing a variety of adhesives. The resultant "patch-type" electrode structures typically are preformed upon the collector surfaces prior to battery manufacture. These assemblies subsequently are combined in combination with gel electrolyte material and the like to form a laminar pile or multicell battery.

A flat battery structure from which enhanced current drain capacities are available is described in copending application of S. A. Buckler, Ser. No. 495,681, filed Aug. 8, 1974, entitled "Flat Battery" and assigned in common herewith. This battery includes both positive and negative active components in an aqueous slurry form as particulate dispersions with electrolyte and a hydrophilic polymeric binder or dispersant. The electrode particles within the slurry are present in a concentration per unit area which is effective to provide an electrically conductive dispersion and, in consequence of the higher surface availability of electrode materials within the electrochemical system, batteries of a desirably broad range of current capacities are readily designed and manufactured. For instance, one such manufacturing technique, described in copending U.S. application for U.S. Pat. by O. E. Wolff, Ser. No. 514,458, filed Oct. 15, 1974 and entitled "Method for Forming A Slurry Battery Cell", also assigned in common herewith, describes that the slurry battery structures may be formed in situ as a step in fabrication of a laminar pile assembly.

In a copending application for U.S. Pat. application Ser. No. 495,628, filed Aug. 8, 1974, by E. H. Land, and now abandoned entitled "Flat Battery", assigned in common herewith, another flat battery structure of enhanced output capacity is described as incorporating a laminar cell structure having a planar cathode assembly including a current collector carrying on one surface, in order, a first cathode mix comprising a particulate dispersion of cathode mix particles in a binder matrix and a second cathode mix comprising a particulate dispersion of cathode mix particles with hydrophilic binder disposed within aqueous electrolyte, i.e., in slurry form. In this hybrid form of slurry electrode structure, a highly desired improved shelf-life characteristic is evidenced in combination with advantageously higher output capacity.

Practical introduction of such batteries as are above described to the marketplace requires that they be manufacturable utilizing relatively high volume techniques. Additionally, because of such intended uses as a component of a film cassette assemblage or the like, a relatively high degree of reliability is required for all batteries produced. One successful manufacturing technique, as is described in a copending application for U.S. Pat. application by L. O. Bruneau, Ser. No. 478,106, filed June 10, 1974, entitled "Flat Battery and Manufacture Thereof", and assigned in common herewith, describes the provision of an electrically insulative continuous carrier upon which pile buildup is carried out utilizing discrete cell components, i.e. polymeric electrically conductive intercell connectors, separators and externally disposed metal-conductive polymeric material current collector assemblies, portions of the metal surfaces of which may serve as terminals for the resultant batteries.

A wide, continuous web approach to multicell battery assembly is described, for instance, in U.S. Pat. No. 3,708,349. As set forth therein, the wide carrier web utilized is a conductive polymeric material, i.e. a carbon impregnated vinyl or the like, having various designated zones, some of which are laminated with a continuous sheet metal strip to form collector assemblies as described, for instance, U.S. Pat. No. 3,741,814. Utilization of duplex electrodes in combination with the noted patch-type active material depositions is described, for instance, in U.S. Pat. Nos. 3,694,266 and 3,770,505, while the noted metal-electrically conductive polymeric externally disposed current collector assemblies are described, for instance, in the noted U.S. Pat. No. 3,741,814. The separator arrangement for providing pile buildup in the method described in the noted U.S. Pat. No. 3,708,349 also is of wide web variety utilizing a preimpregnation of border sealant as described in U.S. Pat. No. 3,784,414.

While the utilization of a continuous wide web of electrically conductive polymeric material as the carrier for a battery manufacturing process would appear to lend itself to advantages in achieving high volume manufacturing rates, yields of reliable batteries in sufficient quantity may be difficult to realize. For instance, the continuous metal-electrically conductive polymer laminate zones of the carrier web necessarily provide for an electrical interconnection of all electrochemically active pile components developed in the course of manufacture. In consequence, voltage buildup phenomena and the like may be witnessed along the assembly line which may derogate from battery performance and, consequently, production system reliability. Additionally, difficulties may be encountered in severing the finally produced discrete batteries from the continuous production line by the development of intercell shorting effects and the like. Further, the polymeric material utilized as the carrier web necessarily is somewhat pliable and difficult to transversely and laterally control so as to achieve necessary registration during assembly of the components of the multicell batteries.

SUMMARY

The present invention is addressed to a method for constructing multicell flat or planar batteries utilizing a wide continuous web of conductive polymeric material as a principal carrier. This web incorporates zones formed as a laminate of the noted carrier material and metal sheet for ultimate formation of the current collector assemblies externally disposed upon the discrete batteries. The invention represents an improvement over the manufacturing process described in the abovementioned U.S. Pat. No. 3,708,349 and provides for the substantial electrical isolation of the laminated metal-polymeric material portions of a multicell assembly throughout the course of cell buildup.

The invention contemplates a manufacturing method wherein, subsequent to the provision of a carrier and zone thereof of metal lamination, discrete and unconnected components of the sheet metal are formed within the laminate, thereby defining discrete current collector assemblies for ultimate battery assembly. To assure appropriate control over the polymeric web, continuous portions of the metal zones are retained to serve as tension rails within the production scheme. Because the metal components of the laminar collector portions of each cell are separate and distinct entities within the web, highly accurate web cutting procedures may be utilized both in the flight line direction of assembly and transversely thereto to form discrete multicell batteries. For instance, through the utilization of laser cutting techniques along nonmetallic portions of the webs, the laminar geometry of each cell is preserved and occurrences of edge shorting effects and the like are substantially obviated. In a preferred embodiment, chemical machining is utilized to form the noted discrete metal components of the zones of the web forming the external current collector assemblies.

Another feature and object of the invention is to provide a method for constructing multicell flat or planar batteries which utilizes a carrier web of continuous conductive polymeric material having at least one zone thereon which is formed as a laminate of the polymeric material and a sheet metal material. As an initial step in the method, the noted laminar zone is machined, preferably by chemical technique, to define discrete and mutually spaced metal surface components of the final battery assembly upon the carrier web. Following such machining step, electrode application procedures are carried out, electrolyte is applied thereover along with a wide web-separator. Severance techniques then are utilized for web cutting parallel to the flight line or path of web movement to define discrete continuous zones carrying intermittent battery components. Following appropriate additional electrolyte application and collation and sealing of individual components, severance by laser cutting or the like transverse to the noted flight line is carried out to form discrete battery elements. Formation of terminal regions, preferably through the utilization of a laser welded strap technique is then carried out, following which packaging procedures are provided.

Through the procedure of the invention, the electrochemically active pile assemblies are substantially electrically isolated while being produced utilizing advantageous wide web carrier techniques. Additionally, inasmuch as metallic surface components of the pile compilations need not be severed to produce discrete battery units, advantageous laser cutting techniques and the like may be utilized to define individual battery components in the final stages of their manufacture.

The invention accordingly comprises the method possessing the combination of steps which are exemplified in the following detailed disclosure.

For a fuller understanding of the nature and objects of the invention, reference should be had to the following detailed description taken in conjunction with the accompanying drawings.

BRIEF DESCRIPTION OF THE DRAWINGS

In the interest of clarity, the cross sectional representations within the drawing have been exaggerated to more clearly portray the internal laminar structure of the batteries. Exemplary dimensions of supportive components of the structures are provided in the discussion to follow to accommodate for the drawing technique utilized.

DETAILED DESCRIPTION OF THE DRAWINGS

Figure 1:
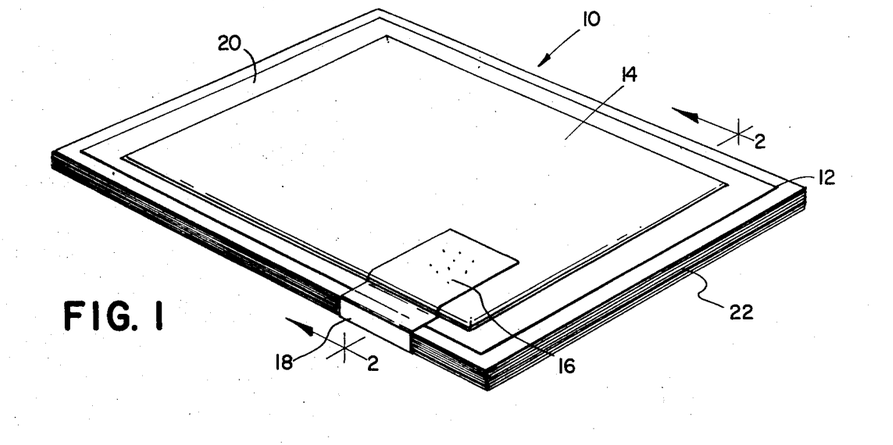
FIG. 1 is a perspective view of a flat primary battery structure fabricated according to the invention, final packaging components being removed for clarity.

A multicell flat battery structure is presented generally at 10 in FIG. 1 as it would appear in an electrochemically active state following component buildup and prior to final packaging. Features of the battery structure apparent from this perspective view include an upwardly disposed anode electrode current collector assembly 12, the outwardly facing surface 14 of which is fashioned of a thin sheet metal to provide for appropriate current collection as well as to participate as a vapor barrier for the more moist components of the pile structure. To provide for terminal definition on a singular side of battery 10, a tab as at 16, formed, for instance, of thin sheet steel or the like, is laser welded to surface 14 and folded about the edge of the assembly for positioning upon the lower surface thereof. An electrically insulative adhesive tape 18 is located immediately beneath tab 16. A cathode electrode current collector assembly (shown in FIG. 2) is provided as the lower component of the battery and serves, along with tab 18, to provide adjacently disposed terminals on one flat surface of the assembly. The slightly depressed peripheral portion 20 of the assembly is occasioned from peripheral sealing procedures provided during a step of assembly. This depression is eliminated from certain of the exaggerated sectional views of the battery provided in later figures. Extending from the periphery of the battery and formed in the course of the latter sealing procedure, is an outer border seal 22 which, in the embodiment shown, represents an extension of compiled separator elements of the pile structure.

Figure 2:
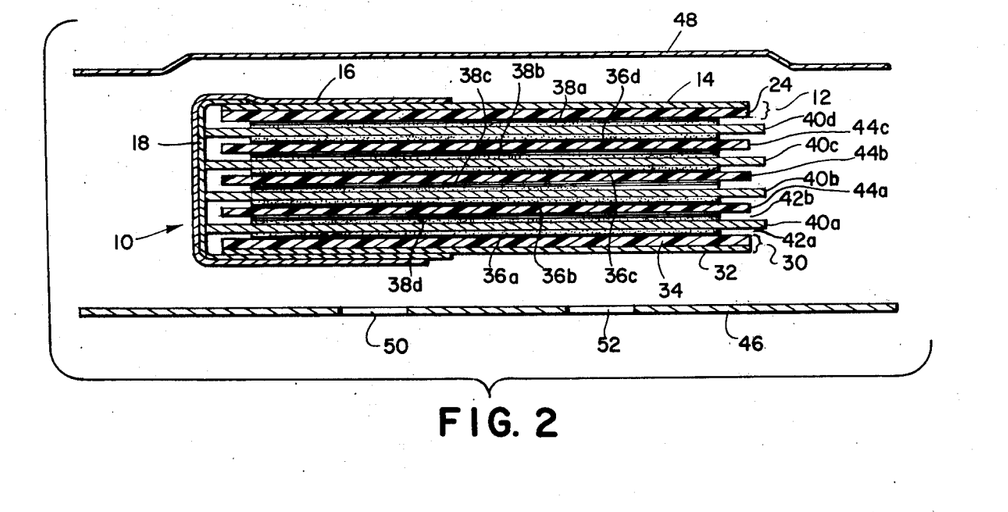
FIG. 2 is a sectional view of the battery structure fabricated according to the invention taken through the plane 2—2 of FIG. 1 and showing, in exploded fashion, a typical final packaging arrangement.

Looking now to FIG. 2, the battery structure ultimately fabricated in accordance with the method of the invention is revealed in more detail. For instance, the earlier described anode electrode current collector assembly 12 is shown to comprise a metallic foil 14 in laminated assembly with a polymeric electrically conductive current collector 24. Polymeric collector element 24 preferably is present as a carbon impregnated vinyl film sold under the trade designation "Condulon" having a thickness in the order of about 2 mils. This material is characterized in exhibiting a resistivity of relatively low value across its traverse direction or thickness while, in turn, exhibiting a resistivity along its length which is relatively higher. At the opposite side of the battery there is provided a cathode electrode current collector assembly 30 which is configured in like fashion as assembly 12. For instance, assembly 30 is laminar in form and includes a metallic sheet or foil current collector 32 which is laminated to a sheet or film 34 of electrically conductive carbon-impregnated vinyl film as in the case of component 24. Both sheets 14 and 32 preferably are present as an annealed tin coated steel or an aluminum or lead sheet material on the order of less than 10 mils. in thickness.

Polymeric current collector sheets 24 and 34 of respective assemblies 12 and 30 also serve as electrode active material supporting elements, component 34 suporting a patch-type positive material or cathodic deposition 36a and component 24 supporting a negative active material or anode patch-type deposition 38a. Dry patch form cathodic mix 36a preferably is made up of material, suited for a LeClanche electrochemical system. Deposition of the mix 36a may be carried out by extruding, printing, silk screening or the like, as a patch situate generally within the central portion of the surface of polymeric collector sheet 34. The cathode material may be provided as an aqueous mixture of particulate carbon, manganese dioxide and binding agent. Following deposition of the mixture, the aqueous phase thereof may be removed by heat induced vaporization so as to provide a particulate cathode mix dispersion within a binder which adheres in intimate contact with the surface of polymeric collector 34.

Negative active deposition 38a also is present as a "dry patch" deposition, being formed of zinc negative active material dispersed in a binder matrix. As in the case of cathode dry-patch deposition 36a, patch 38a is formed upon the surface of polymeric collector sheet 24 by printing, silk screening, or the like an aqueous mixture of the particulate negative active material in combination with a binding agent. The aqueous phase of this mixture is removed subsequent to deposition by heat induced vaporization. Such dry-patch electrode structures further are described, for instance, in U.S. Pat. No. 3,770,504.

The cell structure within which positive active material 36a electrochemically participates also includes a sheet separator 40a, a dry patch anode deposition 38d identical to that disposed at 38a, and gel electrolyte depositions 42a and 42b. Active material 38d is deposited upon a conductive polymeric sheet electrode support 44a. Support 44a also serves as an intercell connector within the multicell pile and, preferably, is formed of a carbon impregnated polymeric material constructed of the same material described in connection with supports 24 and 34. Recall, in this regard, that this material is somewhat unidirectionally conductive, allowing current to pass from one face to the other thereof while remaining impermeable to the materials within an associated cell. Note that the support 44a is dimensioned in the cross sectional aspects shown such that separator sheet 40a as well as identical separator sheets 40b–40d extend beyond its peripheral edges. Such an arrangement avoids edge shorting effects and the like which may take place between adjacent electrode support elements as a consequence of manufacture or subsequent use. Among the materials coventionally used as separators, mention may be made of fibres and cellulosic materials, woven or nonwoven fibrous materials such as polyester, nylon, polypropylene, polyethylene or glass. The peripheral portion of each separator within the pile buildup may be preimpregnated with an adhesive to provide the peripheral sealing feature of the battery. One sealing arrangement which may be utilized with the structure illustrated is described, for instance, in U.S. Pat. No. 3,784,414.

Separator 40a may be wetted from each side by a gel electrolyte as indicated at 42a and 42b. Also, a single application of gel electrolyte may be provided, which, following an interval of time, will migrate to provide a substantially uniform dispersion thereof within the cell. For the LeClanche electrochemical system described, this electrolyte ordinarily will comprise a conventional aqueous solution of ammonium chloride/zinc chloride, about 1.4:1 dispersed in a polymeric binder such as hydroxyethyl-cellulose, etc., on the order of about 3%. In addition, a small quantity of mercuric chloride may be present in the electrolyte as a corrosion inhibitor. Preferably, the electrolyte is deposited in the course of manufacture by offset printing or positive displacement techniques. As is apparent from the drawing, the multicell assembly may be formed of a plurality of series coupled cells, such coupling being effected through the utilization of intercell connectors 44a–44c to derive a four-cell structure. These cells are substantially identical in structure. To facilitate the identification of each of the components of the remainder of the cells illustrated, related identical components are identified by similar numeration utilizing progressive alphabetical designations. For instance, the intercell connectors are identified at 44a–44c, negative active materials are identified at 38a–38d, positive active materials are identified at 36a–36d and electrolyte depositions are identified at 42a–42h.

As disclosed in a copending application for U.S. Pat. application by R. Fanciullo, entitled "Flat Battery", filed on Sept. 10, 1975, Ser. No. 612,210 and assigned in common herewith, to provide for optimized out-gasing of each of the cells within the multicell pile, sealing of the peripheral portions of separator components 40a–40d may be carried out slightly inboard of the outer periphery of the separators. With such an arrangement, the peripheral edge portions of intercell connectors and electrode supports 44a–44c as well as supports 24 and 34 are atmospherically exposed to facilitate the exodus of gaseous effluvia which may be generated in the course of electrochemical activity of the battery.

Final packaging of the multicell structure is carried out by affixing one side thereof to a card stock support as at 46 and covering the upper side thereof with a thin polymeric film 48. The latter film is adhesively applied against stock 46 to complete packaging. Note the presence of apertures 50 and 52. These openings are so located within card 46 as to provide access to terminal defining portions of surfaces 32 and 16.

Looking now to the procedure for fabricating batteries having the general structure described in connection with FIGS. 1 and 2, it generally may be observed that the instant process is one utilizing a continuous wide web of material participating in battery performance as a manufacturing carrier. Also, with the process of the invention, very accurate edge configuration is achieved to provide improved manufacturing yields. It may be observed that the seal defining peripheral structures of the batteries at hand are somewhat extensive when compared to conventional compressively packaged batteries. Accordingly, it is necessary to evolve high-volume manufacturing techniques which assure the proper development of design laminar geometries in each discrete battery produced.

Similar to the method described in the above-noted U.S. Pat. No. 3,708,349, the instant method utilizes a continuous wide-web of carbon impregnated polymeric sheet as at least an initial carrier within the manufacturing process. The material also may be characterized as being somewhat pliable, therefore, not being of particularly ideal suitability as a wide carrier web. However, with the method of the invention, the characteristics of the material as well as materials laminated thereto are utilized to achieve manufacturing advantage. In the embodiment to be described, the conductive polymeric carrier may be, for instance, on the order of about 30 inches in width and, for the photographic purposes described above, such width is sufficient to define two multicell battery structures when the components thereof ultimately are compiled in laminar form. In the manufacturing process, component buildup upon this carrier web is such that individual zones thereon defining laminae of the battery are laterally shifted in correspondence from the midpoint of the web to achieve ultimate compilation. In the discourse to follow, the term flight line is considered to be one of art and describes the major direction of movement of the carrier web and carried components as they progress through the manufacturing process. The flight-line direction is represented in the figures by an arrow.

Figure 3:
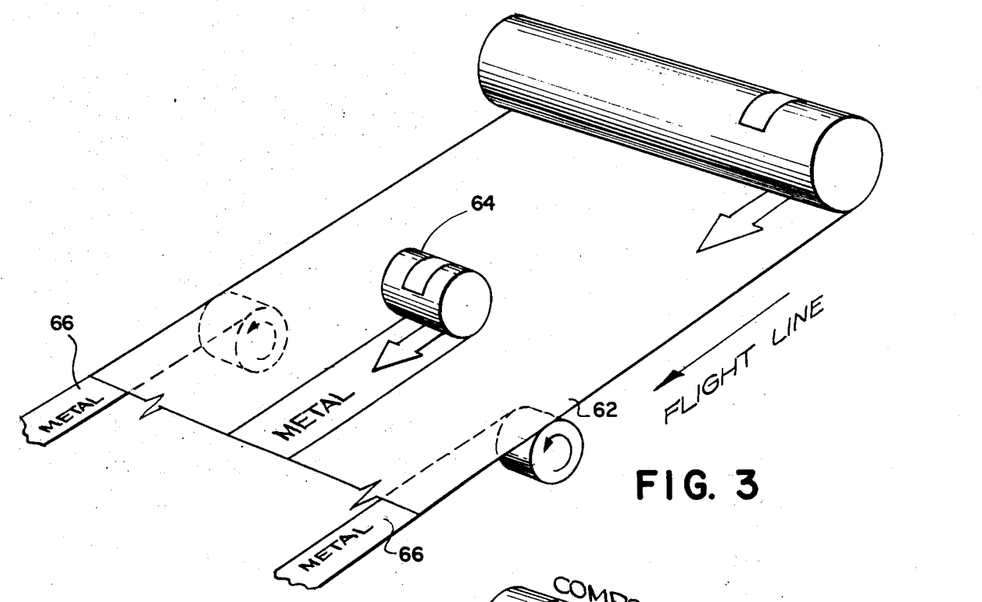
FIG. 3 is a schematic and pictorial representation of a step for laminating a continuous wide web of conductive plastic material with continuous layers of metal along select zones.
Figure 4:
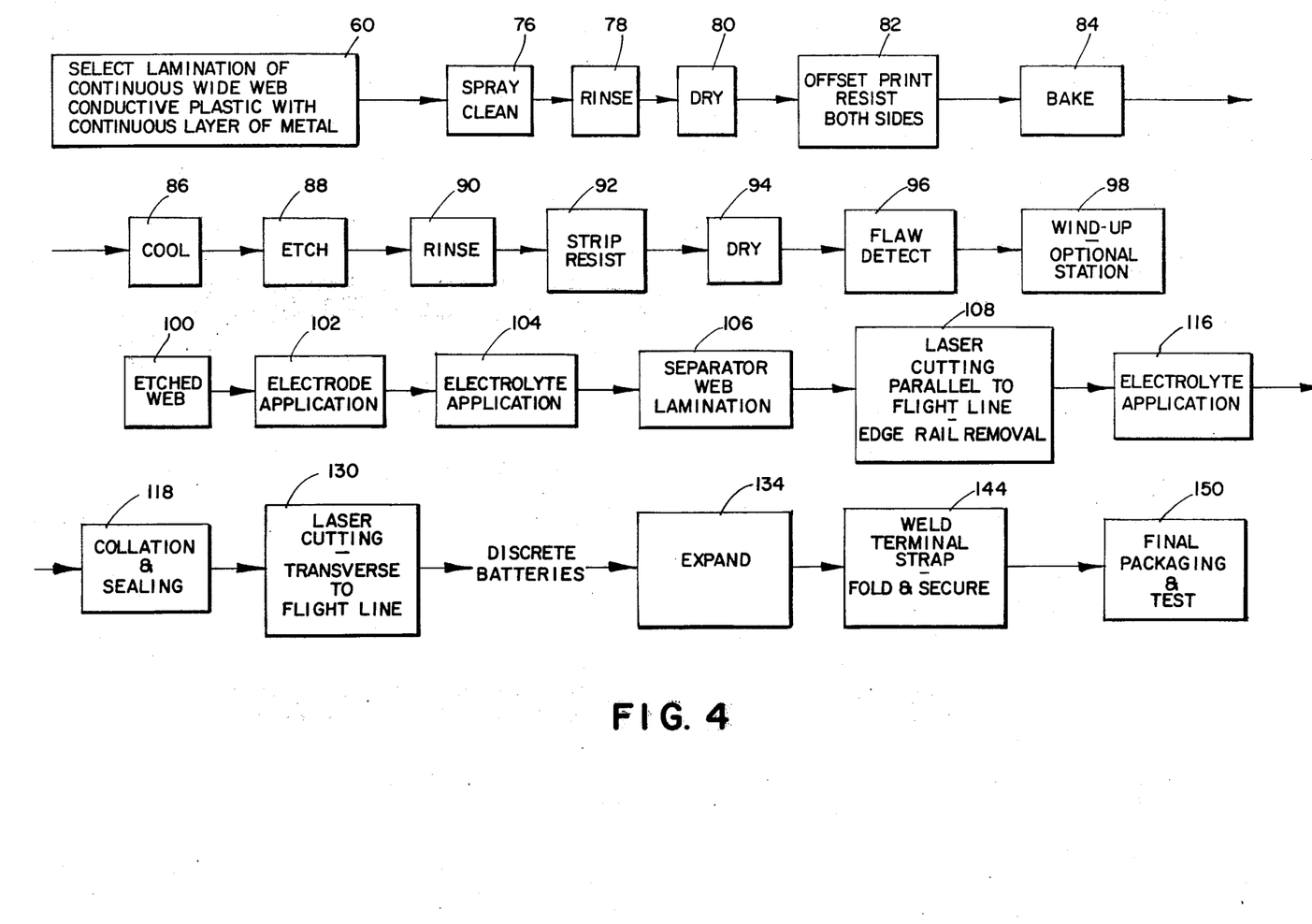
FIG. 4 is a block-type flow diagram describing various aspects of the method of the invention.

As represented in FIG. 3 and at process function block 60 in FIG. 4, an initial step in the process of manufacture of the battery is that of laminating a continuous strip of metal foil at select zonal locations to the conductive polymeric carrier web. As represented at FIG. 3, the basic web material is identified at 62, while the metal foil being laminated thereto is represented at 64 for central zone IV (see FIG. 13) and at 66 for zones I and II. As described earlier, the metal foil selected may be, for instance, an annealed tin coated steel, one surface of which is roughened by wire brush technique, following which it is primed with conductive vinyl solution, which solution is dried, and the steel sheet is slit to the dimensions required for the noted zones. Application to the carrier 62 is by passing the composite laminar arrangement through heat and pressure-providing rolls or the like.

Figure 5:
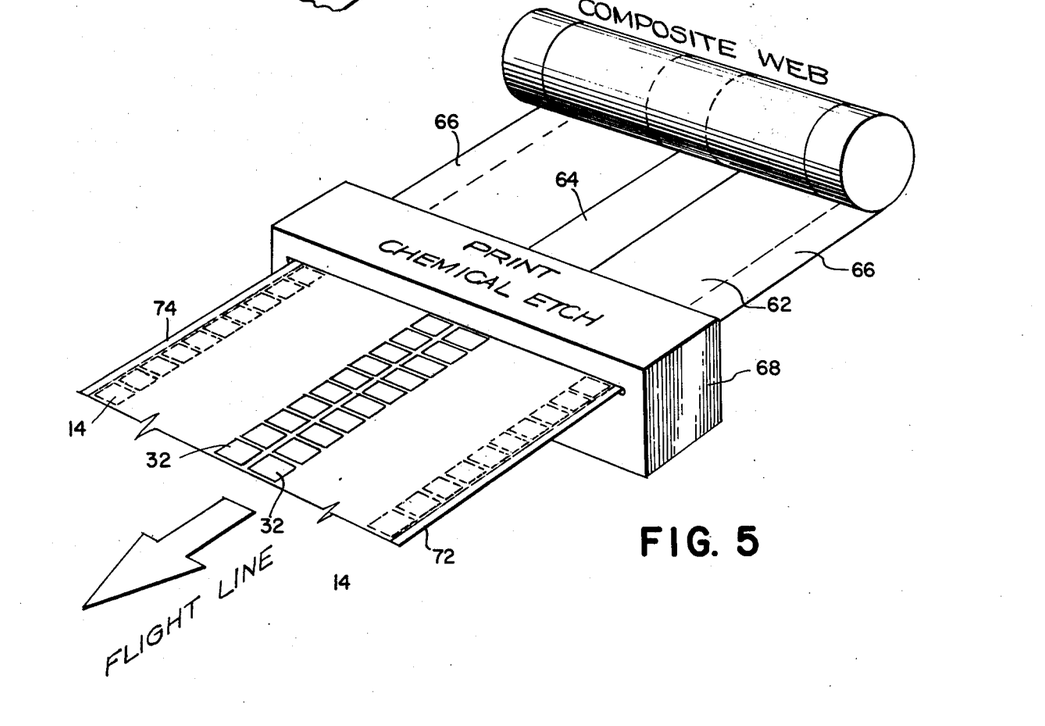
FIG. 5 is a schematic and pictorial representation of a chemical milling step in the method of the invention.

The resultant composite web then may be wound up for further insertion within the process or directly introduced into a chemical machining series of stages. These stages are represented in FIG. 5 at 68 and are utilized for selectively removing metal foil from the web. The chemical machining technique, sometimes referred to as "chemical milling" is well represented in the art, typical systems being produced, for instance, by Chemcut Corporation, State College, Pennsylvania. The function of the chemical machining step 68 is to derive discrete and mutually unconnected components from sheet metal strip 66 and 64, which components remain properly laminated with the continuous polymeric carrier sheet 62. These components serve in the final battery structure, respectively, as current collector 14 and current collector 32. The chemical machining step at 68 also provides for two continuous and peripherally disposed edge components 72 and 74. The integrity of the metal 66-carrier sheet 62 laminate remains along these portions and they serve in the process to follow as tension rails. Tension rails 72 and 74, particularly, are useful in pulling the pliable polymeric sheet carrier 62 through printing stations and the like.

Figures 13, 14A, 14B, 14C, 14D, 14E, 15:
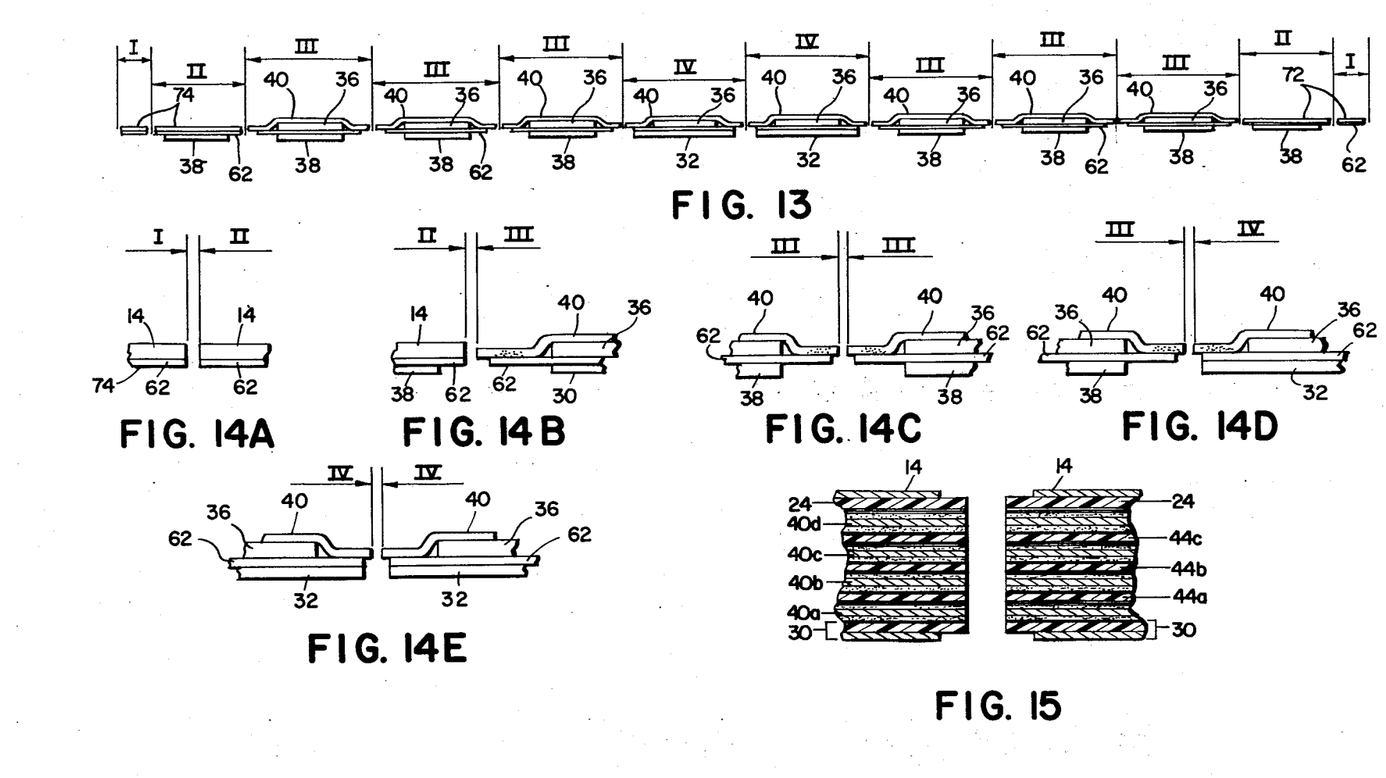
FIG. 13 is an exaggerated cross sectional representation of the carrier technique of the invention.
FIGS. 14A–E are enlarged representation of flight line directional cuts made in the carrier representations of FIG. 13.
FIG. 15 is a cross sectional representation of severance of batteries according to the invention as such severance is made in a direction transverse to the manufacturing flight line.

As is apparent, the shape and dimensions of the steel polymeric sheet current collector discrete components are selected as described in conjunction with elements 14 and 32 of FIG. 2. To further clarify the description of the multiple battery buildup process, FIG. 13 shows, in exaggerated form, a dual series of the noted zones designated I through IV symmetrically dispersed about the midpoint of web 62. Each series of zones ultimately is brought together to form a completed battery pile structure. Note that zones I and II as well as IV commence to be built up with step 68 and that no highly conductive electrical association exists along the progressive line of discrete metallic components of the assembly line. In the flight line direction of assembly, only the carbon impregnated polymeric carrier web is conductive and its conductivity in the flight line direction is relatively dismissible as discussed hereinabove.

As noted by functional station 68 in FIG. 5, the chemical machining process basically is one of printing a resist over the areas of metal components 64 and 66 which are to remain in lamination and chemically etching the unprinted metal portions away. Looking additionally to FIG. 4, exemplary steps incorporated in such process include an initial one shown at 76 wherein the composite web is spray cleaned utilizing a solvent suited for removing foreign matter which otherwise may affect either application of the resist material or deleteriously affect the etchant. Following spray cleaning, the composite web is rinsed as depicted at block 78 and thereupon dried as depicted at block 80. The composite web now is in condition for printing the resist as, for instance, by off-set process. This operation is depicted at block 82 and will be carried out on both sides of the composite web so as to form appropriate discrete areas within both metal laminates 64 and 66. The printed resist then is baked as depicted at block 84 and, following cooling as shown in process block 86, is etched as at block 88. The etchant, for instance ferric chloride, dissolves all portions of the metal laminates 64 and 66 which are not protected by the printed resist to derive the individual components of the system, as described in connection with FIG. 5 at 14 and 32. The thus chemically machined web then is rinsed as depicted at process function block 90, following which the resist material is stripped or removed by an appropriate solvent as represented at process function block 92. The web then is dried as represented at function block 94 and is ready for electrochemically active material buildup.

It should be observed that the electrically conductive polymeric sheet 62 is not affected by the chemical milling process. Consequently, the chemical milling process may be carried on without affecting the laminar integrity of the metal components of the multizonal web.

Another advantageous outgrowth of this unique forming step within the battery manufacturing process resides in an ablility to detect flaws in the metal-electrically conductive polymeric sheet laminate portions of the web. For instance, pinhole-type dysfuntions in the polymeric sheet 62 represent defects within a multicellular battery structure which ultimately may lead to shortened shelf life and failure. Accordingly, it is desirable to detect such flaws prior to cell buildup. While photo-detecting techniques may be utilized to identify pinhole effects and the like within an unlaminated electrically conductive polymeric sheet 62, such detecting techniques are not available in those zonal portions of the web as at I, II, and IV because of the metal foil lamination. However, where such defects occur within the metal-polymeric sheet lamination, the chemical machining etchant will form a corresponding pinhole or the like in the metal cover. Accordingly, all portions of the web may be examined by photo-detecting technique to determine flaws. This step in manufacturing procedure is represented in FIG. 4 at process function block 96. Those portions of the web showing such dysfunctions may be marked for later removal in the process or at a convenient location determined by the operator.

As shown at function block 98, the web now may be wound up for insertion within later stages of the production line or, optionally, may be continued into such line without interruption.

Figure 6:
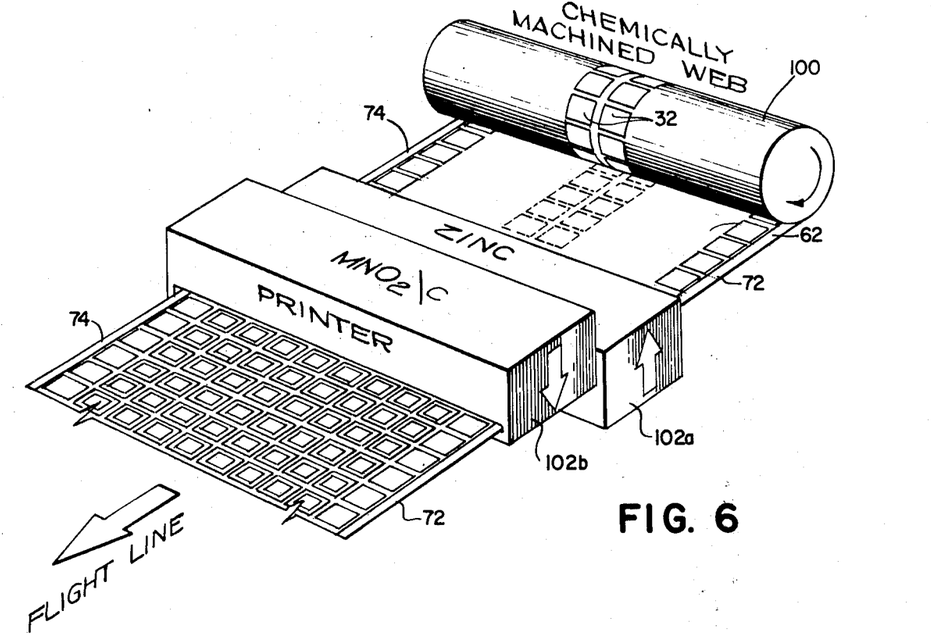
FIG. 6 is a schematic and pictorial representation of the steps of depositing electrode active material upon a carrier web in accordance with the method of the invention.

The introduction of the chemically machined or etched web to the remainder of the manufacturing process is represented by process function block 100 in FIG. 4 and by the chemically machined composite web 100 shown in FIG. 6. The initial processing station which this web 100 meets is that of electrode application as represented at block 102. At this step in the process, as depicted further in FIG. 6 in connection with stations 102a and 102b, patch-type positive and negative electrodes are deposited or printed upon the chemically machined web 100. The deposition technique may, for instance, be similar to that described in the above-mentioned U.S. Pat. No. 3,784,406. Note from FIG. 6 that the printing of negative electrode active material at block 102a takes place at the underside of web 100, while the printing or decomposition of positive dry-patch materials takes place over the opposite side of the web, as represented at station 102b. Such printing takes place in registry on mutually opposed sides of the web within zone III, while only negative active material is deposited in zone II and only positive active material is deposited in zone IV (see FIG. 13).

To facilitate the identifications of zinc-type negative active electrode material depositions as well as magnesium dioxide/carbon positive active material depositions, their basic numeration as shown in FIG. 2, is reproduced without alphabetical suffix in FIG. 13.

Following appropriate removal of the vapor phase of the dry patch electrode active material, a coating of the above-described gel electrolyte is applied thereover as depicted at function block 104 and FIG. 4. This deposition takes place with accuracy to assure that no electrolyte flows over peripheral areas of the zones intended for subsequent sealing purposes. Note that this electrolyte application takes place only over the top side patch depositions of web 100, i.e., over negative active dry patch electrode material 36.

Figure 7:
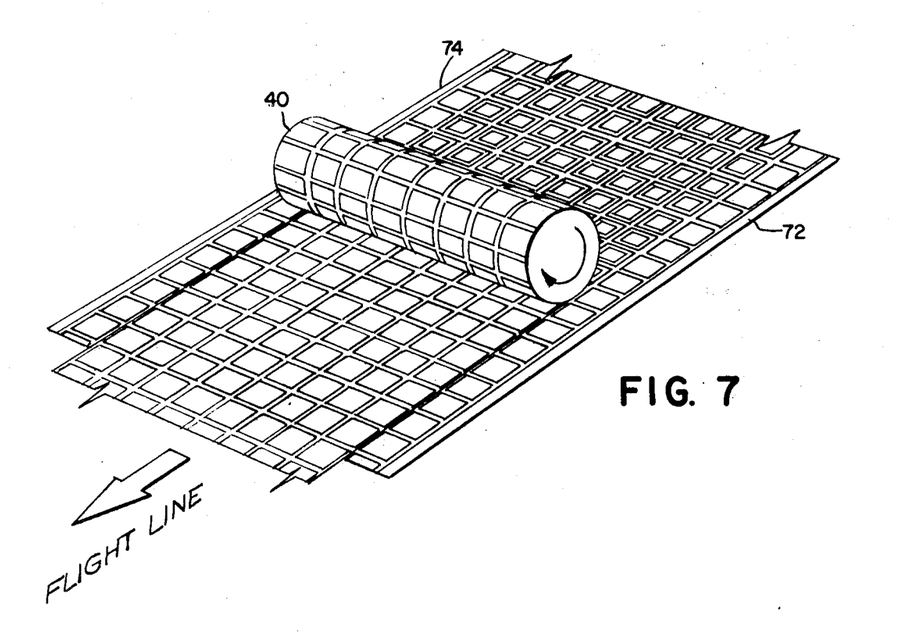
FIG. 7 is a pictorial and schematic representation of the provision of a separator web in accordance with the method of the invention.

As represented at processing function block 106, the separator components of the battery described earlier at 40a–d in connection with FIG. 2, are next introduced into the manufacturing process. As before, these components are represented in FIG. 7 by the numerical designation 40 without an alphabetical suffix. FIG. 7 reveals that separators 40 are applied from a wide web of separator material extending across zones II, III, and IV, identified in FIG. 13. As described in the aforementioned U.S. Pat. No. 3,708,349 as well as in U.S. Pat. No. 3,784,414, the separator web 40 may be preimpregnated with a sealant in a grid pattern defining both the outer boundary of the individual separator components as well as the inner separator portions which are intended to be wetted with electrolyte. When appropriately applied in registration over the composite web as heretofore described, the general laminar geometrical arrangement of components is similar to that shown in connection with FIG. 13.

As revealed at process function block 108, the built-up wide web next is cut or severed utilizing a series of laser cuts applied continuously along or parallel with manufacturing flight-line movement. Further, as part of this severing operation, tensioning rails 72 and 74 are removed. Three distinct cutting actions are utilized in this procedure and are selected with respect to the form of materials and cut geometry contemplated. For instance, it may be recognized that carbon impregnated polymeric carrier web 62 is of a dense black coloration rendering it highly suited to accurate cutting by laser technique. Only a relatively minimum amount of laser energy is required to carry out the required laser cut because of the dark color, reflection being minimal. Additionally, for all of the laser cutting procedures, no pressure is applied to the composite wide web, material being removed within the narrow influence of the projected laser beam. Laser cutting device and techniques are well known in the art, such devices being produced, for instance, by American Optical Co., Inc., Southbridge, Mass. Considering the photographic application, web thicknesses and materials contemplated, a carbon dioxide basic generating laser as depicted at 110 in FIG. 8, may be utilized. Looking to that figure, following a reflection of the principally generated beam, as represented at 112, the reflected beam is utilized by each of three separate reflecting installations identified at 108a, 108b, and 108c. Component 108a utilizes the reflected beam in a defocus mode for the purpose of removing, in selective fashion, the polymeric sheet 62 at appropriate locations wherein it is positioned between adjacent metal or foil components as at 72, 74, and at 32. Looking to FIG. 14A, such cuts as are provided between zones I and II are revealed in closer detail. It should be understood that FIG. 14A may be considered in mirror reversal fashion to contemplate the opposite side of the entire wire web. This arrangement will be recognized as holding true for the remainder of the cuts across the symmetrically built-up web. Through the defocus mode for the laser cut, the same form of cut into web 62 may be made intermediate zones III and IV as is revealed in FIG. 14D. For instance, the laser beam in the instant mode is arranged having an energy value such that separator web 40 is not affected, while material of the web 62 is removed within a predefined dimension. The cut between the latter zones is made from beneath the web.

Figure 8:
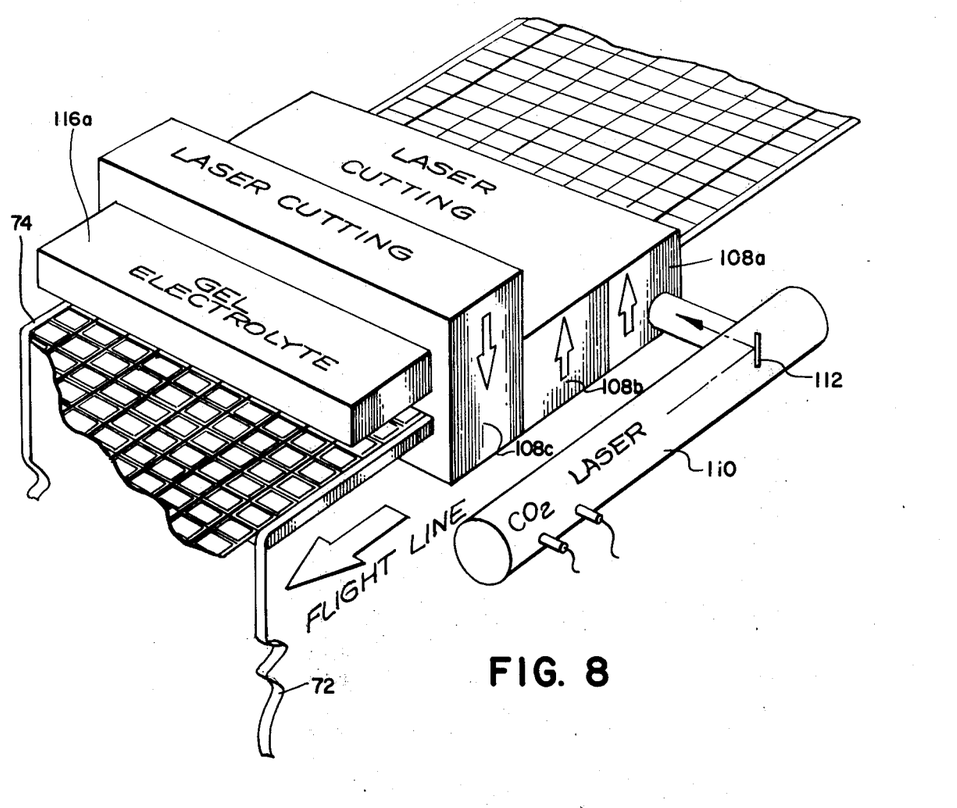
FIG. 8 is a schematic and pictorial representation of steps of laser cutting parallel to the flight line of production as well as one electrolyte gel application.

As the initially severed web moves into laser cutting module 108b as shown in FIG. 8, a wide beam cut mode is provided for cutting web 62 between adjacent zones III. Here again, separator web 40 is not affected and the selectively wider cut is revealed in FIG. 14C.

As the composite web moves into laser cutting module 108c, a higher energy narrower-focus type laser beam is provided having an energy selected for severing the material of separator web 40. Note that all longitudinal or flight-line directional cuts made into web 62 have been completed at this stage of the severing process. The more narrow beam utilized in cutting web 40, as revealed in FIG. 13 as well as FIGS. 14B-14E, derives width-wise differentials between select components of the pile structure, thereby providing the "kerfing" effect revealed in the cross-sectional drawings. Such technique may be found advantageous where it is desired to assure the electrical isolation of electrically conductive web material 62. It further may be noted that no portion of the steel laminate as at 64 or 66 and as subsequently chemically machined is the subject of laser cutting. Accordingly, laser energy required to carry out the process is within reasonable bounds.

Returning to FIG. 4, following laser cutting as evolved at laser module 108c, gel electrolyte again, may be applied, as revealed in function block 116 and shown schematically at FIG. 8 at 116a. This application may be provided by extrusion, offset printing and like techniques and is made only on the upper side of the composite web. Note that electrolyte is not applied over zones I and II. Where preferred, the instant electrolyte application may be utilized in the absence of the application described earlier in connection with block 104 of FIG. 4. With the latter electrolyte application, continuous narrow webs represented by zones II through IV are redirected in appropriately juxtaposed orientation within two groupings representing two separate battery assembly lines as revealed in FIG. 9 and represented at process function block 118 in FIG. 4.

Figure 9:
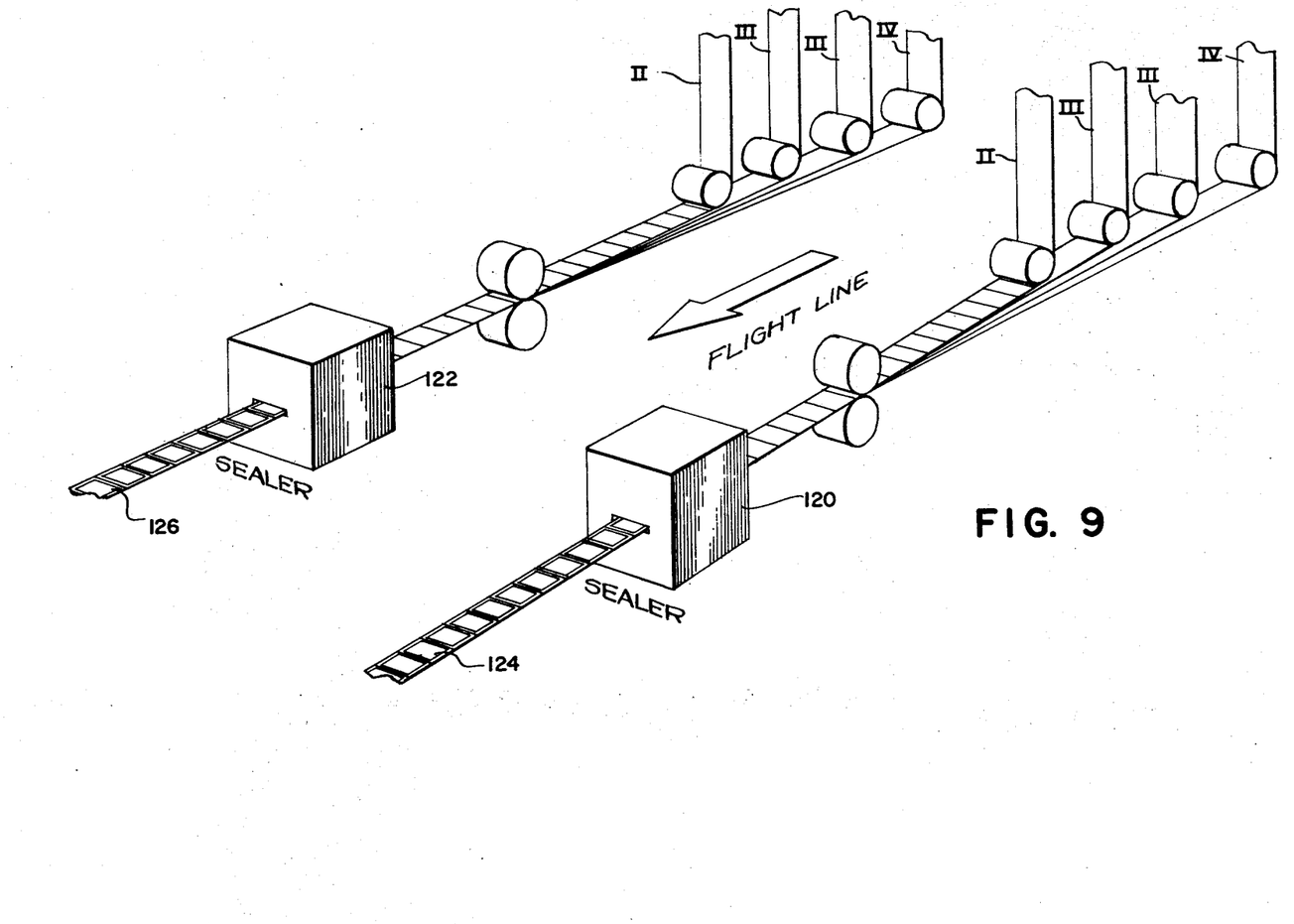
FIG. 9 is a pictorial and schematic representation of battery element compilation and sealing.

Following appropriate collation or registration of the individual components within each cell structure of the separate assembly lines, each battery unit within the continuous assembly is sealed, as represented by sealing units 120 and 122. Note that as the individual single zone wide continuous lines of batteries enter within sealers 120 and 122, they are interconnected by electrically insulative continuous separator web 40 and continuous polymeric electrode support material 62. It may be recalled that the latter web is characterized in being a poor conductor of electrical current in its longitudinal direction, i.e. along the flight-line of manufacture. Accordingly, voltage buildup phenomina along the electrochemically active assembly line is avoided. Note further, that no continuous interconnection of the metallic components of the battery manufacturing line is present. Sealing as at units 120 and 122 may be thermal in nature and may be provided through application of pressure and heat exclusively about the peripheries of each battery unit as it passes through the sealing stations. The degree of heat utilized is selected for activating the thermally responsive sealant preimpregnated as a pattern within separator web 40. To accommodate for undue heating of the electrochemically active components of the batteries as they pass stations 120 and 122, water cooled platens may be utilized for temperature control within the central portions of each battery element. The resultant dual, continuous lines of multicell batteries, connected as described, are shown exiting from stations 120 and 122, respectively, at 124 and 126.

Figure 10:
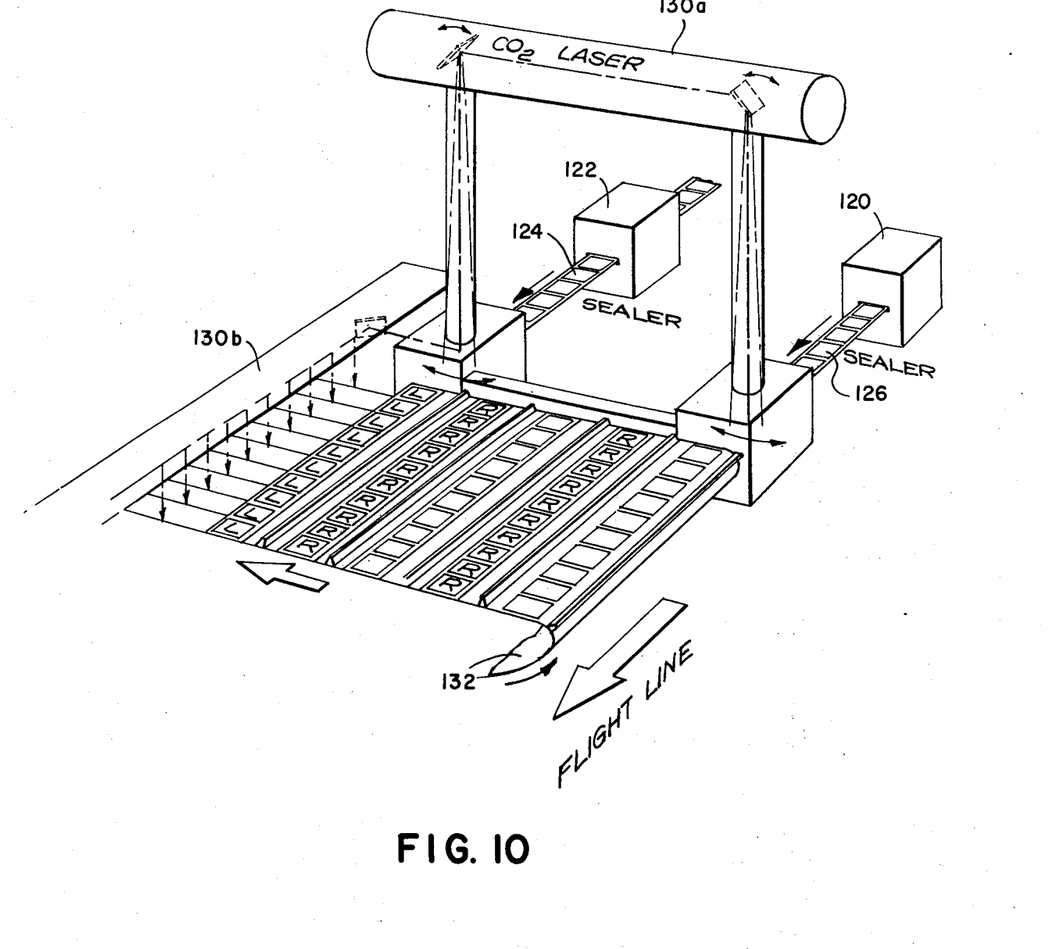
FIG. 10 is a pictorial and schematic representation of the step of severing batteries in a direction transverse to the flight line of production.

Looking to manufacturing function block 130 of FIG. 4 as well as to FIG. 10, coupled battery lines 124 and 126 next are introduced into a laser cutting station, as depicted at 130a, for purposes of providing severence in a direction transverse to the flight line. In the arrangement shown at 130a in FIG. 10, groupings of 10 interconnected multicell battery units are severed by a carbon dioxide laser 130a to form strips of 10 coupled batteries. Right side line 126 and left side line 124 are drawn through station 130a to the extent of 10 battery elements and these groupings are supported upon a conveyor 132. Following the severence, both the left side manufacturing strip of ten batteries emanating from line 124 as well as the right side strip emanating from line 126 are introduced into a reflective nine-cut laser station 130b. At this station, the remaining requisite nine transverse laser cuts are made to provide individual or discrete multicell batteries. Looking momentarily to FIG. 15, the straight transverse cut provided by the laser is depicted. Note that the laser cut provided assures a proper laminar geometry for each battery unit, the laser cutting technique being one wherein material is vaporized and removed as opposed to being compressed. As revealed at FIG. 4, the production line now is concerned with discrete battery elements which are to be finally packaged.

Figure 11:
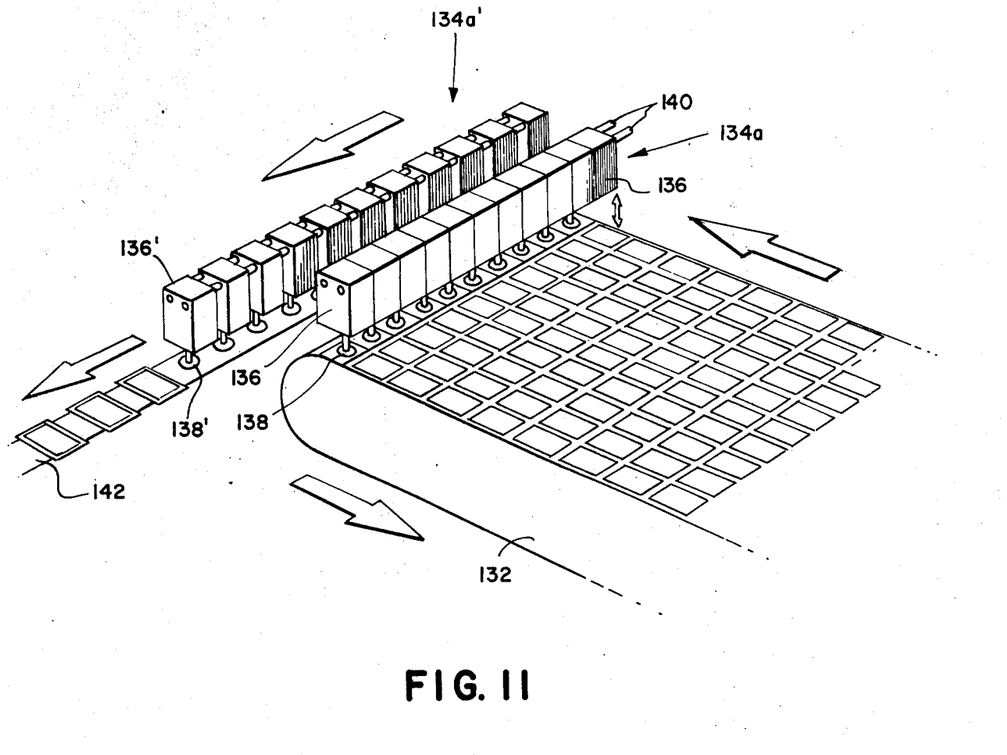
FIG. 11 is a pictorial and schematic representation of an expanding technique in the assembly method of the invention.

Looking to process function block 134 in FIG. 4, the initial procedure in final packaging is that of expanding the pitch or spacing of individual battery units when transferring them to support 46 (FIG. 2) which now is identified as a card carrier. Looking to FIG. 11, conveyor 132 moves the discrete multicell elements from cutting station 130b to a conventional expander station. This station, represented generally at 134a, is formed, for instance, of a plurality of pick and place type elements 136 each of which carries a vacuum-type connective device as shown at 138. The elements 136 are supported from expander rods as at 140 and, as a line of of ten batteries is presented to unit 134a from conveyor 132, each individual battery is grasped by a respective vacuum device or pick 138 and the entire unit is moved laterally to its orientation at 134a whereat the pick and place elements 136 are expanded in longitudinal direction, as represented at 136, to alter in expanded fashion the pitch or line spacing between each individual cell. A carrier as at 142 then moves the individual discrete battery elements to the next fabricating station.

Figure 12:
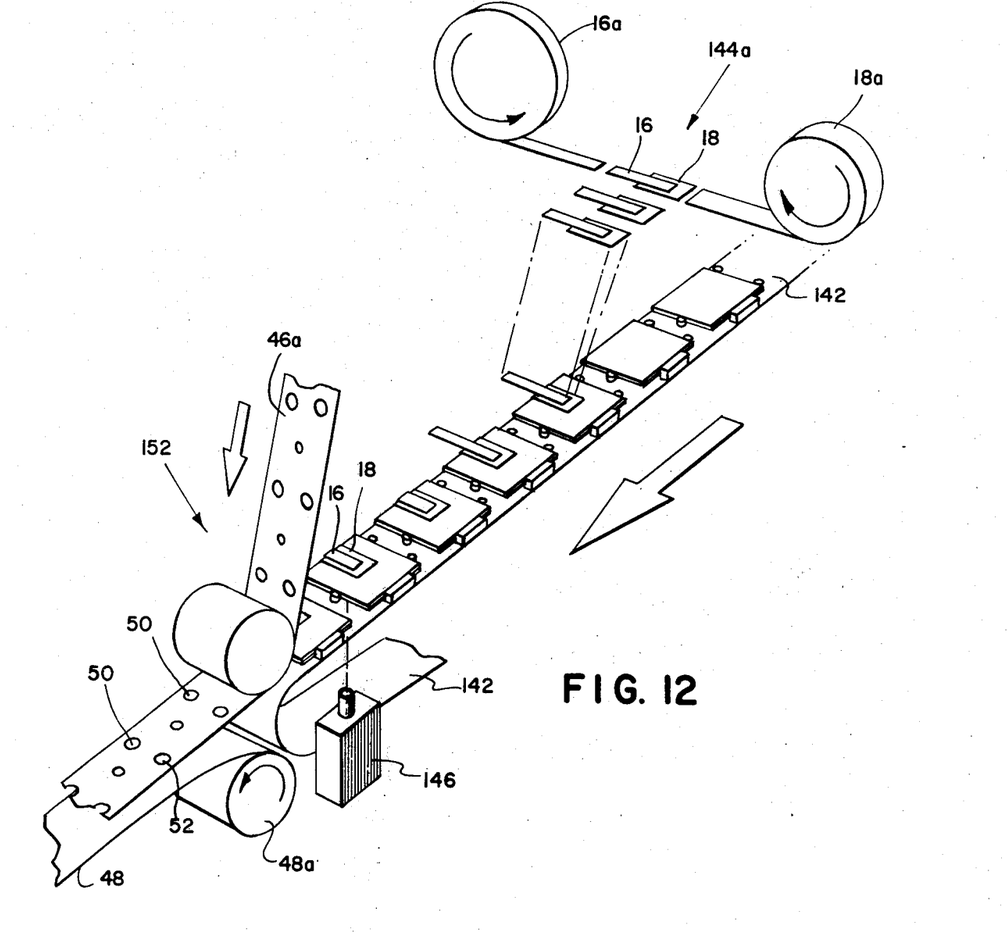
FIG. 12 is a pictorial and schematic representation of final steps in the assembly of batteries in accordance with the invention.

The latter station is represented in FIG. 4 at 144 and is shown generally in FIG. 12 at 144a. At this station, the wrap-around tab and insulative tape assembly providing for juxtaposed terminals at one side of the battery as described in connection with FIG. 2 at 16 and 18, is applied. In this regard, a supply of dual adhesive surface tape is shown in 18a, while a corresponding supply of electrically conductive foil, for instance, formed substantially of the same material as collector foils 14 or 32 is shown being supplied from roll 16a. Through the utilization suitable assembly machinery, for instance, such as that marketed by Minnesota Mining and Manufacturing Company, St. Paul, Minnesota, components 16 and 18 may be applied by initially positioning discrete tape elements 18 over the appropriate surface of each multicell assembly, following which an element 16 is adhered thereto such that it extends over one peripheral side of the battery element. The extended portion of element 16 then is folded about the battery such that it extends over an adjacent collector surface 14 of each battery (FIGS. 1 and 2). Each of the batteries then is moved to a laser welding station as shown at 146, whereupon, for instance, using a nine spot welding technique, the bottom side of element 16 is welded to sheet 14 to effect an electrically conductive relationship therewith.

As revealed at function block 150, final packaging of the thus constructed battery units is provided by transferring each unit, in succession, to a card carrier emanating from a supply 46a. As discussed in connection with FIG. 2 at 46, this card material provides an insulative bottom support for each battery and is adhesively adhered to the appropriate side of the batteries of the oncoming production line. As the batteries are transferred to the under side of card carrier 46a, a film overwrap, described earlier at 48 in connection with FIG. 2, and shown being supplied from roll 48a, is applied adhesively over the discrete batteries and the exposed downwardly facing surface of card stock 46a. The final step is packaging is that of severing card stock 46a as well as overwrap 48a to provide packaged discrete battery elements. As further represented at block 150 of FIG. 4, testing procedures may be carried out as a final procedure of the manufacturing process.

As may be evidenced from the foregoing, the battery manufacturing process of the invention enjoys considerable advantage in providing more accurate formation of the peripheral geometries of each individual multicell battery. This accuracy is achieved while still maintaining the utilization of high volume manufacturing techniques. Additionally, this high-volume manufacturing arrangement can be carried out without substantially or deleteriously electrical inter-association of the individual cells of the batteries as they are moved along the manufacturing line of flight. Further, the technique of the invention permits a pinhole inspection of metal-electrically conductive polymeric sheet laminate portions of the cell structures.

The electrically conductive plastic used in the continuous carrier strip 62 may be produced by casting, extrusion, calendaring, or other suitable techniques. The conductive plastics may be made, for example, from materials such as polymers loaded with electrically conductive particles and containing various stabilizers and/or plasticizers. The conductive particles may be carbonaceous materials such as graphite or acetylene black or other suitable particles. Polymers which by themselves are sufficiently conductive may also be used. For batteries using LeClanche and moderately concentrated alkaline electrolytes, the conductive plastic may be for example selected from material such as polyacrylates, polyvinyl halides, polyvinylidene halides, polyacrylonitriles, copolymers of vinyl chloride and vinylidene chloride, polychloroprene, and butadiene-styrene or butadiene-acrylonitrile resins. For batteries using strongly alkaline electrolytes, polyvinylchloride and polyolfins such as polyethylene and polyisobutylene may be used in the preparation of the conductive plastic. For batteries using acid electrolytes such as sulfuric acid, polyvinyl halides, copolymers of vinyl chloride and vinylidene chloride may be used.

Concerning the adhesives, which preferably are pre-impregnated into the sheet separator material, such adhesives may be applied in liberal quantity to assure that all pores within the separator are completely filled in the appropriate area of adhesive application. For this form of seal, the adhesive should be electrically non-conductive and may be selected from a wide variety of materials including such adhesive cements as catalyzed uncured epoxy resins, phenolic resin solutions, ethylene copolymer hot melts, pressure sensitive elastomer mixtures, thermoplastic resin solutions, and natural gums and resins and their solutions. The adhesives which may be used may be ones which attain their adhesive quality for the first time during assembly of the battery as a result of the application of pressure, heat, ultrasonics or other forms of energy.

While it is preferred to employ the LeClanche electrochemical system (comprising manganese dioxide positive active material, zinc negative active material, and an electrolyte comprising ammonium chloride and/or zinc chloride), the multicell batteries of the invention may employ a wide variety of electrochemical systems including both primary and secondary systems. Among the positive electrode materials are such commonly used inorganic metal oxides as manganese dioxide, lead dioxide, nickle oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium and iron. The invention may employ the electrolyte commonly used in the LeClanche system, various alkaline electrolytes such as the hydroxides of potassium, sodium and/or lithium, acidic electrolytes such as sulfuric or phosphoric acid, and nonaqueous electrolytes, the electrolytes, of course, being chosen to be compatible with the positive and negative electrodes.

Among the wide variety of electrochemical systems which may be used in the multicell batteries are those in which the positive electrodes comprise manganese dioxide, the negative electrodes comprise metals such as zinc, aluminum, or magnesium, and the electrolyte substantially comprises an acidic solution of inorganic salts. Another commonly known system is one wherein the positive electrodes comprise manganese dioxide, the negative electrodes comprise zinc, and the electrolyte substantially comprises a solution of potassium hydroxide. Other aqueous electrolyte systems including those of nickel-zinc, silver zinc, mercury-zinc, mercury-cadmium, and nickle-cadmium also may be utilized.

Systems employing organic positive electrodes and acidic electrolytes may also be used including rechargeable systems using axodicarbonamide compound electrodes and LeClanche electrolyte.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. In a method for constructing multicell batteries wherein intermittent deposits of electrode materials, separator means and electrolyte are provided in spaced relationship along select zones over a continuous electrically conductive polymeric web, at least one select zone of said web present at an initial stage of said method as a laminate of said polymeric material and continuous metal material for deriving externally disposed metal current collector surfaces of said batteries, said zones being compiled and subsequently severed transversely and parallel to the manufacturing flight line direction of zone movement to derive discrete ones of said batteries, the improvement comprising the step of removing select portions of said sheet metal material to provide discrete and mutually spaced components of said sheet metal remaining laminated with said continuous polymeric material to define discrete current collector assemblies for said batteries.

2. The method of claim 1 wherein said removal is carried out by chemical machining.

3. The method of claim 1 wherein said step removing select portions of said sheet metal is carried out to provide at least one continuous strip of metal remaining laminated with said continuous polymeric material for deriving a web tension adjustment feature.

4. The method of claim 3 wherein said removal is carried out by chemical machining.

5. The method of claim 1 including the step of severing said continuous web of polymeric material parallel to said flight line direction at locations spaced outwardly of said discrete metal components to mutually separate said zones.

6. The method of claim 5 wherein said step of severing is carried out by laser cutting.

7. The method of claim 5 wherein said step of severing is carried out subsequent to said compilation of zones.

8. The method of claim 5 including the step of severing said separate zones transversely to said flight line direction at locations spaced from the peripheries of said discrete metal components to provide discrete ones of said multicell batteries.

9. The method of claim 8 wherein said steps of severing are carried out by laser cutting.

10. The method for constructing planar multicell batteries comprising the steps of:
   providing a continuous web of electrically conductive polymeric material, said material having a plurality of zones defined across its widthwise dimension, at least one said zone representing a lamination of said web with a continuous layer of metallic material;
   moving said web in a manufacturing flight line direction parallel with the lengthwise dimension of said web;
   selectively removing said metallic material from said web in a manner defining a continuous succession of discrete selectively dimensioned and mutually spaced laminar collector assemblies;
   providing spaced, intermittent deposits of select electrode active material along said zones;
   selectively combining said electrode material deposits with separator means, sealing means and electrolyte;
   isolating said zones by initially severing said web at the boundaries of said zones parallel to said flight line direction;
   compiling said zones to bring said electrode material deposits, electrolyte, sealing means and separator means into registry to form multicell pile structures;
   sealing the peripheries of said multicell pile structures; and
   severing said web transversely to said flight line direction at locations intermediate said spaced collector assemblies to provide discrete multicell batteries.

11. The method for constructing planar multicell batteries of claim 10 in which said removal of said metallic material is carried out by chemical machining.

12. The method for constructing planar multicell batteries of claim 11 including the step of detecting for flaws within said collector assemblies subsequent to said step of selectively removing said metallic material from said web.

13. The method for constructing planar multicell batteries of claim 10 in which said removal of said metallic material is carried out in a manner providing at least one continuous tension rail formed as a continuous zone of said laminate of said metallic material and said web.

14. The method for constructing planar multicell batteries of claim 13 including the step of removing said tension rail in conjunction with said step of initially severing said web parallel to said flight line direction.

15. The method for constructing planar multicell batteries of claim 10 in which said initial severance of said web is carried out by laser cutting.

16. The method for constructing planar multicell batteries of claim 10 in which said severance of said web transversely to said flight line direction is carried out by laser cutting.

17. The method for constructing planar multicell batteries of claim 10 wherein said zones are compiled such that said metallic material of said discrete laminar collector assemblies are externally disposed upon said multicell pile structures, and including the steps of attaching terminal strap means to the surface of one said metallic surface of each said pile structure and bending said strap to extend about said structure to provide a portion thereof in adjacency with the collector assembly oppositely disposed from said one collector assembly.

18. The method for constructing planar multicell batteries of claim 17 wherein said terminal strap means attachment is carried out by laser welding.

19. The method for constructing planar multicell batteries of claim 10 wherein said sealing means initially is combined in continuous web form of selected multiple zone width.

20. The method for constructing planar multicell batteries of claim 19 in which said initial severance of said web is carried out by laser cutting said web of polymeric material and said sealing means web, said sealing means laser cut having a first width and said polymeric material web laser cut having a second width selectively wider than said first width.

21. The method for constructing planar multicell batteries of claim 10 wherein said sealing means is preimpregnated within said separator means in a predetermined pattern and the sealing means impregnated separator means initially is combined in continuous web form of selected multiple zone width; and
   said initial severance of said web is carried out by laser cutting said web of polymeric material and said impregnated separator means web, said impregnated separator means web laser cut having a first selected width and said polymeric material web laser cut having a second width selectively wider than said first width.

22. The method for constructing planar multicell batteries of claim 10 in which:
   said removal of said metallic material is carried out by chemical machining; and
   wherein said initial severance of said web is carried out by laser cutting.

23. The method for contructing planar multicell batteries of claim 10 in which:
   said removal of said metallic material is carried out by chemical machining; and
   said initial severance and said severance of said web transversely to said flight line direction are carried out by laser cutting.

24. The method for constructing planar multicell batteries of claim 10 in which:
   said removal of said metallic material is carried out by chemical machining;
   said severence of said web transversely to said flight-line direction is carried out by laser cutting;
   said sealing means initially is combined in continuous web form of select multiple zone width; and
   said initial severence of said web is carried out by laser cutting said web of polymeric material and said sealing means web, said sealing means initial laser cut having a first width and said polymeric material web laser cut having a second width selectively wider than said first width.

25. The method for constructing planar multicell batteries comprising the steps of:
   providing a continuous thin web of carbon impregnated polymeric sheet material, said material having a plurality of zones defined across its widthwise dimension, at least one said zone representing a lamination of said web with a continuous sheet of metal current collector material;
   moving said web in a manufacturing flight line direction;
   removing select portions of said metal material from said web by chemically machining to provide a continuous succession of discrete, selectively dimensioned and mutually spaced laminar collector assemblies;
   placing spaced, intermittent deposits of electrode material along said zones;
   overlaying select said zones with separator means and sealing means combined in continuous web form of multizone width;
   depositing gel electrolyte in the regions of said electrode deposits;
   isolating said zones by initially laser cutting said polymeric web and said separator means and sealing means web at the boundaries of said zones parallel to said flight line direction;
   compiling said zones to bring said electrode material deposits, said electrolyte, sealing means and separator means into registry to form multicell pile structures;
   thermally sealing said multicell pile structures about the peripheries thereof; and
   severing said compiled web zones transversely to said flight line direction intermediate said spaced collector assemblies by laser cutting to provide discrete multicell batteries.

26. The method for constructing planar multicell batteries of claim 25 in which said chemical machining is carried out in a manner providing at least one continuous tension rail formed as a continuous zone of said laminate of said metal and said polymeric web, said tension rail metal being isolated from the metal of said discrete collector assemblies.

27. The method for constructing planar multicell batteries of claim 25 including the step of detecting for pinhole flaws within said collector assemblies subsequent to said step of chemical machining said metal material.

28. The method for constructing planar multicell batteries of claim 25 in which said initial laser cutting of said polymeric material web is provided at a first cut width and said initial laser cutting of said sealing means and said separator means web is provided at a second cut width selectively wider than said first cut width.

* * * * *